INVENTORS
JAMES G. S. CHUA
LEONARD DIETCH
BY Nicholas A. Camasto
ATTY.

INVENTORS
JAMES G. S. CHUA
LEONARD DIETCH
BY Nicholas A. Camasto
ATTY.

United States Patent Office 3,321,709
Patented May 23, 1967

3,321,709
QUADRATURE GRID DETECTOR HAVING MEANS FOR INHIBITING UNDESIRABLE OSCILLATIONS

Leonard Dietch, Skokie, and James G. S. Chua, Roselle, Ill., assignors to Admiral Corporation, Chicago, Ill., a corporation of Delaware
Filed May 6, 1964, Ser. No. 365,383
7 Claims. (Cl. 325—349)

This invention relates to FM detector circuits. More specifically it relates to FM detector circuits using a quadrature-grid detector circuit to demodulate a frequency modulated signal.

The invention will be described in an environment of the audio detection portion of a television receiver, but it should be appreciated that this embodiment is merely for the convenience of description, and should not be construed as a limitation of the invention.

Locked oscillator quadrature-grid detector circuits are currently preferred for extracting audio information from the audio portion of a composite television signal received by a television set. The quadrature-grid circuit has found favor due to the fact that it provides detection, amplification, limiting, and audio output in a single pentode of conventional design.

However, the quadrature-grid circuit as currently used has a marked drawback in that it imparts an undesirable audio signal to the speaker immediately following the instant that the television receiver is turned off. Heretofore, methods found adequate to prevent this undesirable signal have also had deleterious side effects (e.g., the most common methods also entailed substantially decreasing the output of the pentode). The invention described herein discloses means for preventing this undesirable signal without introduction of any such deleterious side effects.

F.C.C. standards require that a composite television signal for any given television channel occupy a bandwidth of 6 megacycles. Each channel is divided into an audio signal portion and a video signal portion, the separation between the video signal carrier and the audio signal carrier being exactly 4.5 megacycles. The composite video signal is amplitude modulated within a 4.5 megacycle bandwidth. The sound subcarrier is frequency modulated by the audio signal and 25 kilocycles represent maximum modulation.

In present day television receivers of the intercarrier type the composite video signal and the audio signal are simultaneously amplified in the video IF section. The intercarrier sound system carries the signals simultaneously through the converter, through the video detector and to the video amplifier, where they are separated.

A beat signal of 4.5 megacycles appears when the video and audio signals are applied to the video detector. The IF stages subdue the sound IF signal relative to the video IF signal and when the two signals are mixed the resultant difference frequency retains the characteristics of the weaker signal. The 4.5 megacycle difference frequency, therefore, exhibits the FM characteristics of the sound IF signal.

The 4.5 megacycle sound IF signal is amplified in the sound IF amplifier and fed to the audio detector for demodulation. The quadrature-grid detection circuit used to demodulate the incoming signal comprises a pentode with a tuned circuit connected to its suppressor grid.

The tuned circuit is excited into oscillation by so-called energy capture by the suppressor grid from the anode-cathode conduction current within the pentode, and interelectrode capacitance between the suppressor grid and the control grid completes a feedback loop, thus enabling the oscillation in the tuned circuit to be self-sustaining.

The 4.5 megacycle output of the sound IF amplifier is applied to the control grid of the pentode. The tuned circuit oscillates, due to the aforementioned energy capture, at 4.5 megacycles and applies an oscillatory potential to the suppressor grid which is in quadrature with the control grid signal when that signal is at its unmodulated frequency.

As the frequency of the input voltage assumes values between 4.5 mc. plus 25 kc. and 4.5 mc. minus 25 kc. the phase difference between the suppressor grid and the control grid deviates from the quadrature position accordingly and regulates the flow of current to the plate. The plate current is thus proportional to the change in frequency of the input voltage, thereby providing detection of the incoming frequency modulated signal.

Upon turn-off of the television set the voltage output of its power supply does not cease abruptly, but rather decays exponentially. The B+ voltages on the screen grid and on the plate of the demodulator tube, both being supplied by the aforementioned power supply, also begin a similar exponential decay. As the screen grid and plate voltages decay, current flow to the plate decreases and a point is reached where there is insufficient energy capture by the suppressor grid within the pentode to sustain oscillation in the tuned circuit and the voltage on the suppressor grid caused by this oscillation disappears. The electrons flowing to the plate, having been accelerated by the suppressor grid voltage, now fall back upon the screen grid and the current flow to the plate is decreased, thus increasing the plate voltage.

This increase in plate voltage then acts to again pull electrons towards the plate and the plate current increases accordingly until the suppressor grid can again capture sufficient energy to excite the tuned circuit into oscillation. This oscillation is only momentary, however, for upon the onset of oscillation an oscillatory potential again appears on the suppressor grid which acts to accelerate electrons towards the plate, thus decreasing the voltage on the plate.

As the plate voltage decays, the current flow past the suppressor grid to the plate is once more decreased until the suppressor grid again cannot capture sufficient energy to sustain oscillation in the tuned circuit.

The tuned circuit is consequently alternately in states of oscillation and non-oscillation dependent upon whether there is sufficient current flow past the suppressor grid to sustain oscillation. It is seen that excitation of the tuned circuit results in a decrease in current flow past the suppressor grid with consequent de-excitation of the tuned circuit, while de-excitation of the tuned circuit results in an increased current flow past the suppressor grid with consequent excitation of the tuned circuit.

Excitation of the tuned circuit occurs each time the residual voltages on the screen grid and on the plate simultaneously traverse certain ranges. The resultant current flow past the suppressor grid is then sufficient to excite the tuned circuit into oscillation. This oscillation, as was previously described, subsequently causes a decrease in the current flow past the suppressor grid with consequent de-excitation of the tuned circuit.

This sequence will repeat itself with the tuned circuit alternately going into states of oscillation and non-oscillation until either the screen grid voltage or the plate voltage has passed through its "danger zone." These "danger zones" are definite ranges which the screen grid voltage and the plate voltage, respectively, pass through responsive to turn-off of the power supply and consequent decay of the operating potentials supplied thereby. Simultaneous occurrences of these respective "danger zone" voltages upon the screen grid and the plate of the pentode is sufficient to initiate unstable or cyclic oscillation within the tuned circuit, the mechanics of which were previously described.

The tuned circuit thus experiences cyclical changes of state during the interval that the screen grid and plate voltages are simultaneously in their respective "danger zone." This change in state of the tuned circuit occurs at an audio rate and is responsible for the aforementioned undesirable audio signal which is reproduced by the speaker.

The invention discloses means for eliminating this undesirable audio signal by forcing the screen grid voltage well past its "danger zone" before the plate voltage begins to traverse its "danger zone."

Accordingly, it is an object of this invention to provide an improved demodulator for frequency modulated signals.

Another object of this invention is to provide an improved demodulator for the frequency modulated audio portion of a composite television signal.

Still another object of this invention is to provide a quadrature-grid detector for frequency modulated audio signals which inhabits undesirable audio signals from occurring responsive to turn-off of its power supply.

A further object of the invention is to provide means inhibiting undesirable oscillations from occurring within the tuned circuit of a quadrature-grid detector responsive to turn-off of its power supply.

A still further object of this invention is to provide means applying a negative potential to the suppressor grid of a quadrature-grid detector pentode for inhibiting undesirable oscillations within the tuned circuit connected to the suppressor grid, from occurring responsive to turn-off of its power supply.

Other objects of the invention will become apparent upon reading the following specification in conjunction with the drawings in which.

Figures 1, 2:
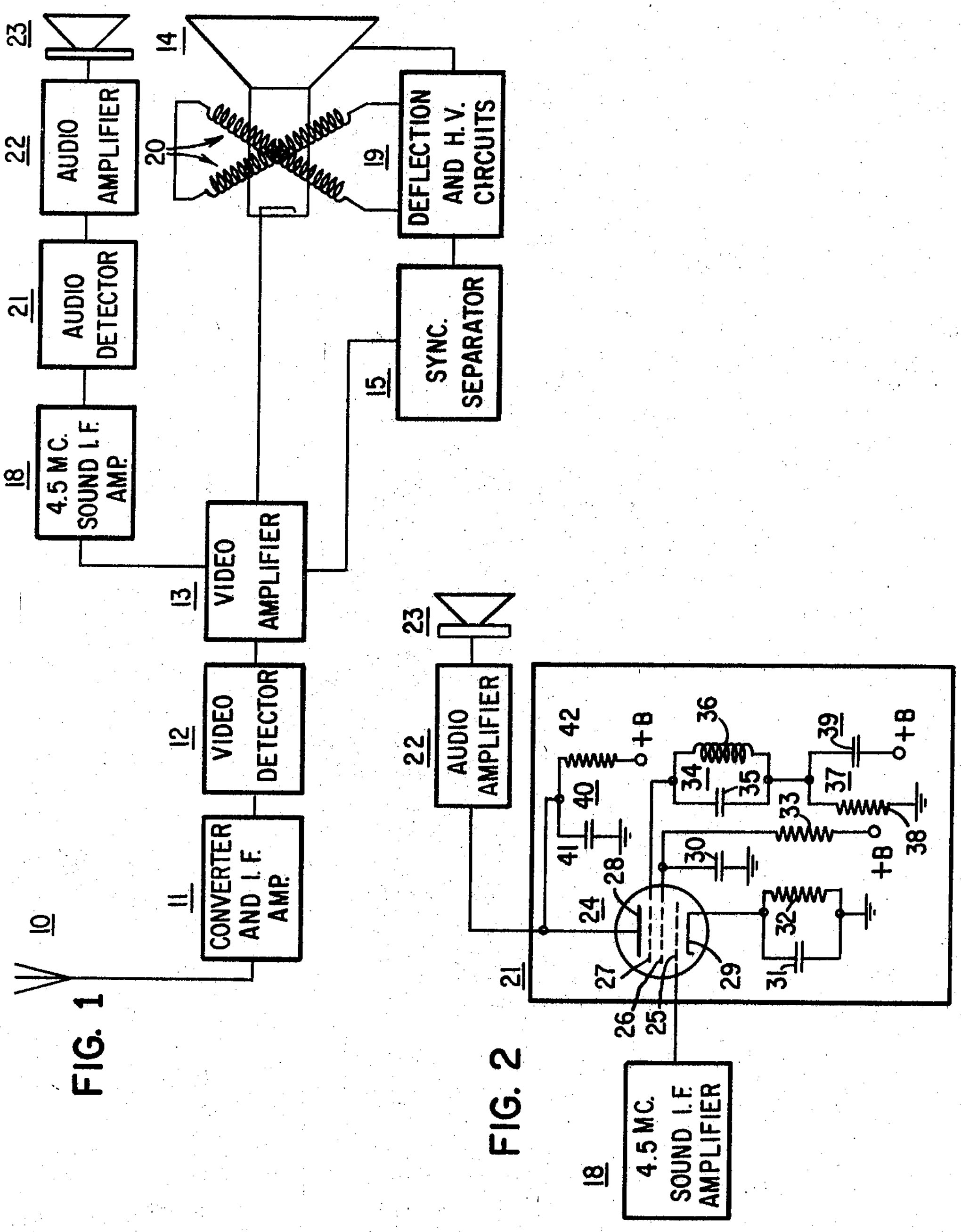
FIGURE 1 is a block diagram of a television receiver.
FIGURE 2 is a partial block and a partial schematic diagram of the audio portion of a television receiver showing a quadrature-grid detector circuit constructed in accordance with the invention.

Referring now to FIGURE 1, antenna 10 is coupled to block 11 which, as is shown, contains converter and IF amplifier circuits. Here, a received television signal is converted to an IF signal and amplified. Block 12, labelled Video Detector, contains circuitry which develops the composite video signal, sync signal components and audio information components. Block 13, labelled Video Amplifier, amplifies and separates the video information components, the synchronizing information components and the audio information components. The video information is applied to picture tube 14, the synchronizing information to block 15, labelled SYNC SEPARATOR, and the audio information to block 18, which is indicated as containing the 4.5 mc. sound IF amplifier. Block 15 contains circuitry separating the horizontal and vertical synchronizing information and feeds this separated information to block 19, labelled Deflection and High Voltage Circuits, which includes circuitry for developing the horizontal and vertical sweep voltages necessary to scan the electron beam across the face of picture tube 14 as well as the high voltage operating potentials required by picture tube 14.

The horizontal and vertical sweep voltages are coupled to deflection windings 20 which generate the electromagnetic forces which direct the electron beam's path across the face of picture tube 14. The high voltage from block 19 is coupled to appropriate electrodes (not shown) in picture tube 14.

Block 18, as is indicated, contains circuitry for amplifying the 4.5 megacycle sound IF signal received from block 13. Block 21, labelled Audio Detector, contains circuitry to retrieve the audio information, which information is then applied to block 22, labelled Audio Amplifier. The audio information is here amplified to a point where it can be reproduced by speaker 23.

The preceding description has been rather brief, since the concepts and circuitry involved are standard and will be understood by those skilled in the art.

FIGURE 2 shows schematically the circuitry found in block 21, labelled Audio Detector. The circuit shown is a quadrature-grid detector circuit, the general operation of which was previously described, comprising a pentode 24, having a control grid 25, a screen grid 26, a suppressor grid 27, a plate 28 and a cathode 29.

Cathode 29 is biased by a capacitor 31 and a resistor 32, which are connected in parallel between cathode 29 and ground. Screen grid 26 is connected to ground through a 4.5 megacycle bypass capacitor 30 and to B+ through a resistor 33. This insures a "soft" screen within the pentode (i.e., the screen grid voltage will vary in accordance with the current drawn by it). A tuned circuit 34, consisting of a capacitor 35 and a coil 36 connected in parallel, is connected to suppressor grid 27. The values of capacitor 35 and coil 36 are such that, when excited, tuned circuit 34 will oscillate at exactly 4.5 megacycles. A suppressor grid bias circuit 37, consisting of a resistor 38 and a capacitor 39, is connected to tuned circuit 34 such that tuned circuit 34 is between and in series with the suppressor grid and its bias circuit. Suppressor grid bias circuit 37 is connected as a differentiating circuit, that is, resistor 38 is connected between tuned circuit 34 and ground and capacitor 39 is connected tuned circuit 34 and B+.

B+ potential is applied to plate 28 through a plate load resistor 42, which is connected to the plate through another 4.5 megacycle bypass capacitor 41. The combination of capacitor 41 and resistor 42 constitutes intergrating circuit 40 for the output signal from pentode 24.

In operation, the 4.5 megacycle output of block 18 is applied to the control grid of pentode 24. B+ voltage on screen grid 26 acts to accelerate the electrons towards the plate. As was previously stated, the 4.5 megacycle voltage across the tuned circuit is in quadrature with the signal on the control grid when the latter is at its unmodulated frequency. As the control grid signal assumes values between 4.5 mc. plus 25 kc. and 4.5 mc. minus 25 kc. the phase between the control grid voltage and the suppressor grid voltage deviates accordingly. This combination of control grid voltage and suppressor grid voltage results in the demodulated output of plate 28. Plate 28 is, in turn, connected to block 22, labelled Audio Amplifier, through integrating circuit 40, which integrates the output of pentode 24, de-emphasizes the high frequency portions of the signal and presents the integrated signal to block 22 for amplification. After amplification, the audio signal is reproduced by speaker 23.

Figure 3:
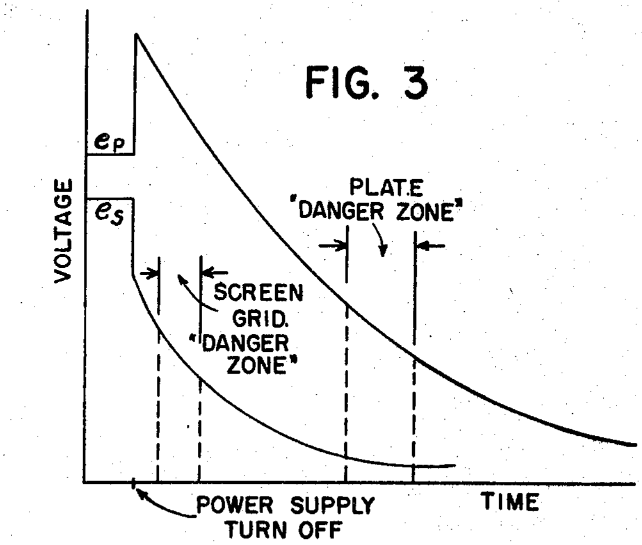
FIGURE 3 is a graphical representation of the voltage decay on the screen grid and the plate of a pentode within a circuit constructed in accordance with the invention.

Upon turn-off of the television receiver the B+ voltages being exponential decay, and differentiating circuit 37, responsive to this change of potential, imparts a sharp spike of negative potential to suppressor grid 27. The effect of this negative spike is to block current flow to the plate almost entirely, thus significantly increasing the plate voltage, and to channel almost all of the current flow to the screen grid, thus sharply depressing the screen grid voltage, before these voltages begin their exponential decay. This decrease in the screen grid voltage and increase in plate voltage forces the screen grid voltage well past its "danger zone" before the plate voltage can decay into its corresponding "danger zone," thus preventing occurrence of any cyclical change in the state of the tuned circuit. The aforementioned effect is graphically represented in FIGURE 3.

Figure 4:
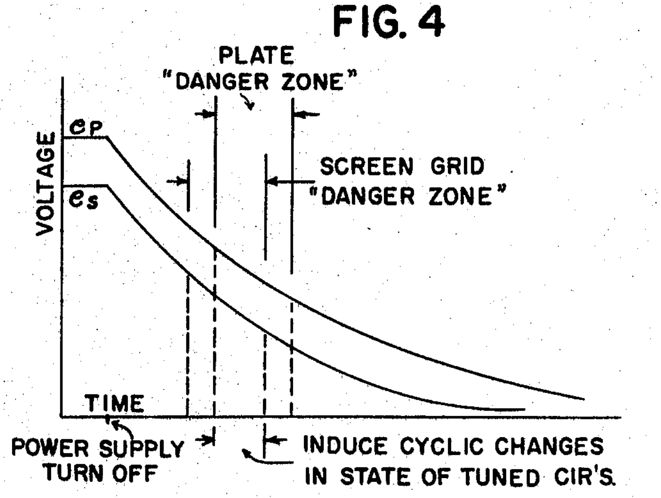
FIGURE 4 is a graphical representation of the voltage decay on the screen grid and the plate of a pentode in a normal quadrature-grid detector.
Figure 5:
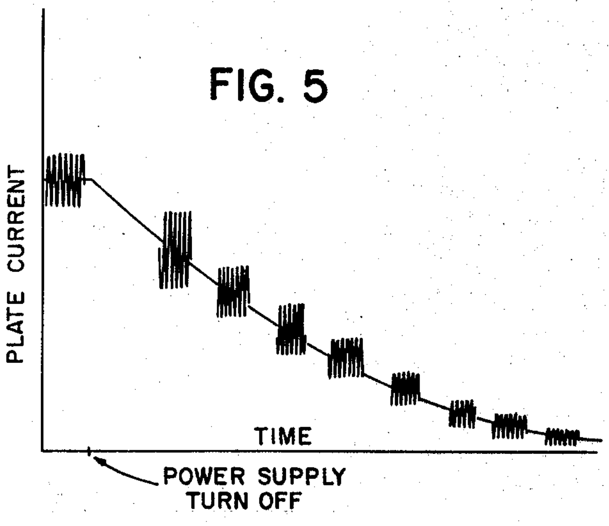
FIGURE 5 is a graphical representation of the output of a pentode in a normal quadrature-grid detector circuit following turn-off of its power supply.

By way of comparison, FIGURE 4 shows the decay of the screen grid voltage and the plate voltage of a pentode within a quadrature grid detector circuit as currently used in the art, with the "danger zones" of the screen grid voltage and the plate voltage indicated. FIGURE 5 represents the output of a pentode in a quadrature grid detector circuit as currently found in the art during the interval that its screen grid voltage and plate voltage are simultaneously traversing their respective "danger zones."

What has been described is an improved demodulator for frequency modulated signals which inhibits undesirable audio signals from occurring responsive to turn-off of its power supply. The invention has been described in the environment of the audio detection circuit of a television receiver, but it should be understood that the invention is not to be so limited. The invention is limited only as described in the claims.

The embodiments of the invention in which an exclusive property or privilege is claimed are defined as follows:

1. A quadrature-grid detector circuit comprising; a pentode vacuum tube including an anode, a cathode, a control grid and a suppressor grid; power supply means supplying D.C. operating potentials to said pentode; means applying a frequency modulated carrier signal to said control grid for detection, resonant means, having an oscillatory and a non-oscillatory mode, coupled to said suppressor grid generating oscillations of the same frequency as said frequency modulated carrier signal, said resonant means being excited into said oscillatory mode by energy capture from the anode-cathode conduction current in said pentode; said resonant means undesirably experiencing cyclical changes between said oscillatory and non-oscillatory modes over a certain range of operating potentials, said certain range of operating potentials being encountered upon turn-off of said power supply and consequent decay of said operating potentials supplied thereby; and means, responsive to turn-off of said power supply, coupling a potential to said suppressor grid for preventing said cyclical changes in the mode of said resonant means.

2. A quadrature-grid detector circuit comprising; a pentode including a screen grid, a suppressor grid and a plate, power supply means supplying D.C. operating potentials to said screen grid and said plate; resonant means having an oscillatory and a non-oscillatory mode coupled to said suppressor grid, said resonant means being excited into said oscillatory mode by energy capture by said suppressor grid from the anode-cathode conduction current within said pentode, said resonant means undesirably experiencing cyclical changes between said oscillatory mode and said non-oscillatory mode over a certain range of operating potentials, said certain range of operating potentials being encountered upon turn-off of said power supply and consequent decay of said operating potentials supplied thereby; and means responsive to turn-off of said power supply coupling a negative potential to said suppressor grid, said negative potential rapidly depressing the potential of said screen grid and increasing the potential of said plate, thereby preventing occurrence of said certain range of operating potentials and consequently preventing said cyclical changes in the mode of said resonant means.

3. A television receiver including means for detecting a received frequency modulated audio signal, said means comprising; a quadrature-grid detector circuit including a pentode having a cathode, a control grid, a screen grid, a suppressor grid and a plate; power supply means supplying D.C. operating potentials to said screen grid and said plate; means applying said frequency modulated audio signal to said control grid; resonant means coupled to said suppressor grid, said resonant means being excited into an oscillatory state by energy capture by said suppressor grid from the anode-cathode conduction current within said pentode, said resonant means undesirably experiencing cyclical changes between said oscillatory state and a non-oscillatory state during the interval that the screen grid voltage and the plate voltage simultaneously traverse certain ranges of operating potentials, said certain ranges of operating potentials being encountered upon turn-off of said power supply and consequent decay of said operating potentials supplied thereby; and means, responsive to said turn-off of said power supply, coupling a potential to said suppressor grid, said potential rapidly changing the potentials on said screen grid and said plate, thereby preventing simultaneous occurrence of said certain ranges of operating potentials and preventing said cyclical changes in the state of said resonant means.

4. A quadrature grid detector circuit comprising; a pentode including a control grid, a screen grid, a suppressor grid and a plate; power supply means supplying D.C. operating potentials to said screen grid and said plate; means applying a frequency modulated carrier signal to said control grid for detection; resonant means having an oscillatory and a non-oscillatory mode coupled to said suppressor grid, said resonant means being excited into said oscillatory mode by energy capture by said suppressor grid from the anode-cathode conduction current within said pentode, said resonant means undesirably experiencing cyclical changes between said oscillatory and said non-oscillatory modes during the interval that the screen grid voltage and the plate voltage simultaneously traverse certain ranges of operating potentials, said certain ranges of operating potentials being encountered upon turn-off of said power supply and consequent decay of said operating potentials supplied thereby, said cyclical changes imparting an undesirable signal to said plate; and means coupled to said suppressor grid responsive to turn-off of said power supply inhibiting passage of said undesirable signal to said plate.

5. A television receiver including detection means detecting and translating a frequency modulated audio signal and a speaker, coupled to said detection means, reproducing said translated audio signal, said detection means comprising; a quadrature grid detector circuit including a pentode having a cathode, a control grid, a screen grid, a suppressor grid and a plate; power supply means supplying D.C. operating potentials to said screen grid and said plate; means applying said frequency modulated audio signal to said control grid for detection; resonant means having an oscillatory and a non-oscillatory mode coupled to said suppressor grid, said resonant means being excited into said oscillatory mode by energy capture by said suppressor grid from the anode-cathode conduction current within said pentode, said resonant means undesirably experiencing cyclical changes between said oscillatory and said non-oscillatory modes during the interval that the screen grid voltage and the plate voltage simultaneously traverse certain ranges of operating potentials, said certain ranges of operating potentials being encountered upon turn-off of said power supply and consequent decay of said operating potentials supplied thereby, said cyclical changes occurring at an audio rate and imparting an undesirable signal to said speaker; and means responsive to said turn-off of said power supply coupling a potential to said suppressor grid, said potential cutting off said plate of said pentode, thereby inhibiting passage of said undesirable audio signal to said speaker.

6. A television receiver including detection means for detecting and translating a frequency modulated audio signal and a speaker, coupled to said detection means, reproducing said translated audio signal, said detection means comprising; a quadrature-grid detector circuit including a pentode having a cathode, a control grid, a suppressor grid, a screen grid and a plate; a power supply supplying D.C. operating potentials to said screen grid and said plate; means applying said frequency modulated audio signal to said control grid for detection; resonant means having an oscillatory and a non-oscillatory mode coupled to said suppressor grid, said resonant means being excited into said oscillatory mode by energy capture by said suppressor grid from the anode-cathode conduction current within said pentode, said resonant means undesirably experiencing cyclical changes between said oscillatory and said non-oscillatory modes during the interval that the screen grid voltage and the plate voltage simultaneously traverse certain ranges of operating potentials, said certain ranges of operating potentials being encountered upon turn-off of said power supply and consequent decay of said operating potentials supplied thereby, said cyclical changes occurring at an audio rate and imparting an undesirable audio signal to said speaker; and differentiating circuit means connected to said power supply coupling a negative potential to said suppressor grid, said negative potential initiated by the change in potential caused by turn-off of said power supply, said negative potential rapidly depressing the potential of said screen grid and increasing the potential of said plate thereby preventing simultaneous occurrence of said certain ranges of operating potentials and preventing said cyclic changes in the mode of said resonant means.

7. A television receiver including detection means for detecting and translating the modulated audio portion of a received composite television signal and a speaker for reproducing audio signals, said modulated audio portion having a frequency modulated carrier signal; said detection means comprising a quadrature-grid detector circuit including a pentode having a cathode, a control grid, a suppressor grid, a screen grid and a plate; a power supply supplying D.C. operating potentials to said screen grid and said plate; means applying said frequency modulated carrier signal to said control grid for detection, a tuned circuit connected to said suppressor grid turned to the frequency of said frequency modulated carrier signal, said tuned circuit being excited into oscillation by energy capture by said suppressor grid from the anode-cathode conduction current within said pentode, said tuned circuit alternating between an oscillatory state and a non-oscillatory state during the interval that the screen grid voltage and the plate voltage simultaneously traverse certain ranges of operating potentials, said certain ranges of operating potentials being encountered upon turn-off of said power supply and consequent decay of said operating potentials supplied thereby, said alternation between an oscillatory state and a non-oscillatory state occurring at an audio rate and causing an undesirable audio signal to be applied to said speaker; and a differentiating circuit including a capacitor, connected between said tuned circuit and one terminal of said power supply, and a resistor, connected between said tuned circuit and another terminal of said power supply; whereby upon turn-off of said power supply said differentiating circuit imparts a negative potential to said suppressor grid, said negative potential rapidly depressing the potential of said screen grid and increasing the potential of said plate, thereby preventing simultaneous occurrence of said certain ranges of operating potentials and consequently inhibiting said undesirable audio signal from being applied to said speaker.

No references cited.

KATHLEEN H. CLAFFY, *Primary Examiner.*

R. S. BELL, *Assistant Examiner.*